April 8, 1924. M. C. SCHWEINERT 1,489,364
CAP FOR VALVES OR THE LIKE
Filed June 5, 1919
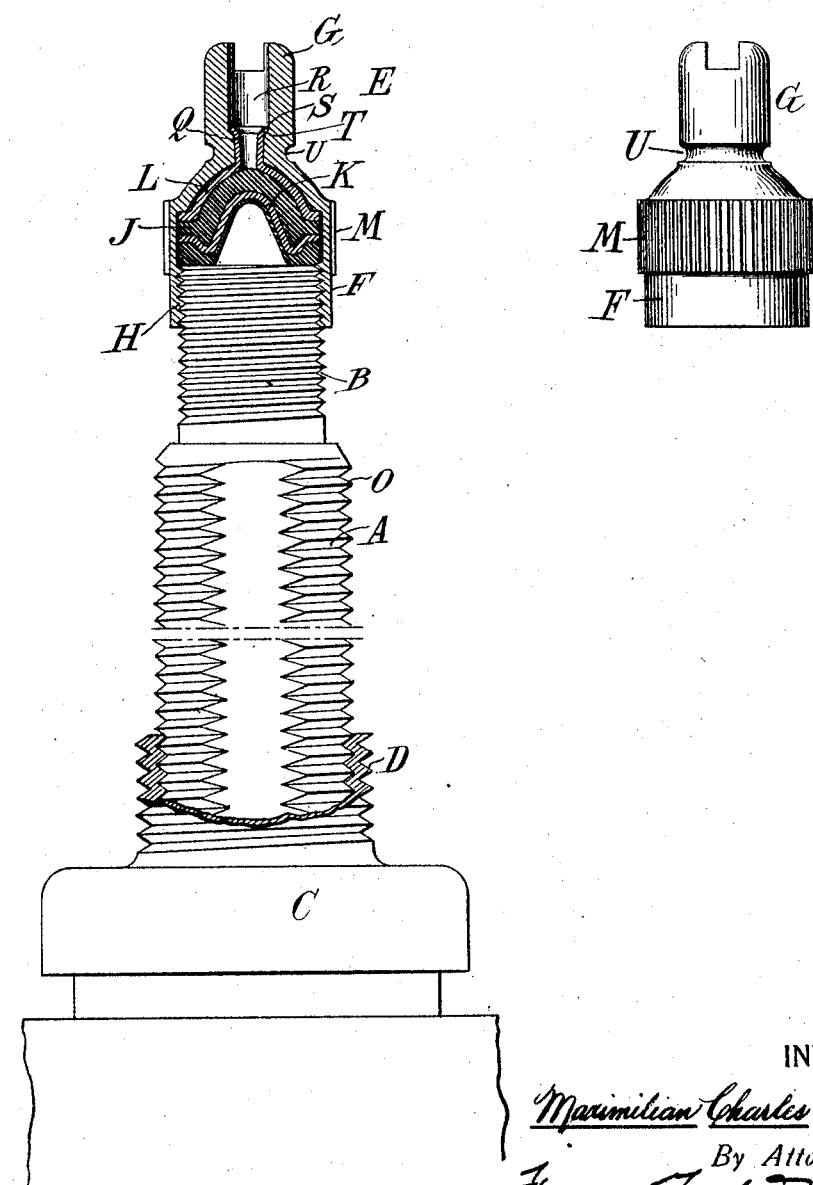
INVENTOR
Maximilian Charles Schweinert
By Attorneys, Patented Apr. 8, 1924.

1,489,364

UNITED STATES PATENT OFFICE.

MAXIMILIAN CHARLES SCHWEINERT, OF WEST HOBOKEN, NEW JERSEY.

CAP FOR VALVES OR THE LIKE.

Application filed June 5, 1919. Serial No. 301,957.

*To all whom it may concern:*

Be it known that I, MAXIMILIAN CHARLES SCHWEINERT, a citizen of the United States of America, residing in West Hoboken, in the county of Hudson and State of New Jersey, have invented certain new and useful Improvements in Caps for Valves or the like, of which the following is a specification.

This invention relates to caps for pneumatic tire valves or the like, and aims to provide certain improvements therein.

In the standard type of tire valve cap there is provided a cap shell which is adapted to screw on the outside of the valve nipple, which shell has a screw-driver projection extending above it. Within the cap is a washer, usually dome-shaped, and between the washer and wall of the cap is an anti-friction disk which permits the cap to be screwed down without distorting the dome-shaped washer. In order to hold the anti-friction disk and dome-shaped washer in position within the cap, the latter is enlarged at its middle to provide an annular recess into which the edges of the anti-friction disk and washer extend. In the standard valve the dimensions of the nipples and caps are uniform, but in the various sizes of valve the bodies of the valve casings are of different diameter. It results, therefore, that in the larger sizes the valve casings are sufficiently larger than the nipple to permit a rim nut or dust cap to pass freely over the valve cap and engage the casings. In the smaller sizes, however, a rim nut or dust cap which will fit the casing is too small internally to pass over the standard valve cap. To permit the use of the standard dust cap, the rim nut is usually provided with a bushing extending upwardly and having an external thread which is of the same diameter as the internal diameter of the standard cap. The internal diameter of the rim nut, however, is subject to the same disadvantage that it will not pass over the standard valve cap, so that the latter must be removed in order to apply the nut.

According to the present invention, I provide a valve cap of such small external diameter that it lies within the diameter of the threads of the smaller valve casings. By this means a rim nut which will fit the casing may be passed freely over the cap. This also adapts the valve for use in connection with a smaller sized dust cap. The invention also includes other features of improvement which will be hereinafter more fully described.

Referring to the drawings, which illustrate one form of the invention,—

Figure 1 is an elevation of the valve, showing the improved valve cap applied thereto in diametrical section.

Fig. 2 is an elevation of the improved form of cap.

Referring to the drawings, let A indicate the valve casing having a nipple B; the valve casing is of relatively small diameter and the nipple B is of standard diameter. C is the standard form of rim nut adapted for such valves, having a screw-threaded extension D, the external diameter of which corresponds with the diameters of valves of larger size and which is adapted to receive a dust cap of standard dimensions.

E indicates the valve cap as a whole. The valve cap is usually made of sheet metal, and comprises a body portion F and screw-driver extension G. The body portion F is formed with an internal screw-thread H which is adapted to engage the threads of the nipple B, and a packing washer J adapted to make a tight joint with the top of the nipple. The packing washer J is shown as of the standard construction having a metal reinforcing disk K. When constructed as illustrated, both the washer and the reinforce are dome-shaped, as shown. Between the top of the packing J and the wall of the valve cap is an anti-friction disk L, which conforms to the general shape of the upper side of the washer. Heretofore such valve caps have been enlarged at the point M to a considerable extent, thereby securing an annular recess open on the interior, into which the edges of the packing washer and anti-friction disk extend, thereby holding these two parts securely within the cap, so that they will not be lost. By the present invention this recess is omitted, and the external diameter of the cap at the portion M is thereby contracted in size until it is less than the grooves O of the threads of the casing A. This permits an interiorly screw-threaded member, such as the rim nut C, to pass freely over the cap.

If the construction were such as to merely omit the annular recess referred to, the cap would have no means of holding the washer and disk securely in place within it, and these parts would be, therefore, constantly in danger of being lost.

According to the present invention, therefore, I provide a means for holding these parts in position within the cap, which means does not involve the enlargement of the external diameter of the cap.

In its preferred form the securing means comprises a part connected with the washer which passes upwardly into the screw-driver projection, and is there provided with a flange or other retaining means which connects it to the cap. In the construction shown the anti-friction disk is selected as such a member and is formed with a projection Q which passes upwardly into the recess R of the screw-driver projection, the end of the projection Q being upset at S so that it overlies a shoulder T formed on the cap. This shoulder T may be conveniently formed by spinning or pressing a portion of the screw-driver projection inwardly from the outside, as shown at U. The packing washer J may be secured to the disk L in any suitable manner as by cement, but preferably the parts are vulcanized together during the operation of forming the packing washer. After the parts are inserted, a suitable tool is passed downwardly through the screw-driver projection and the upset portion or flange S thereby formed. This construction permits the anti-friction disk L to swivel with relation to the cap, so that distortion of the packing is minimized or avoided. Other means for securing the washer in place may be availed of.

While I have shown and described one form of the invention, it will be understood that I do not wish to be limited thereto, since various changes may be made therein without departing from the spirit of the invention.

What I claim is:—

1. A valve cap having a packing washer adapted to seat against the top of a tire valve casing and means united to said washer adapted to hold it in place within the cap, said means being wholly enclosed within the cap and centrally engaged and held by a part of the cap.

2. A valve cap having a packing washer adapted to seat against the top of a tire valve casing and an anti-friction disk wholly within the cap united to said washer, said anti-friction disk having a centrally arranged part engaged by means within the cap, whereby the washer and anti-friction disk are held in place.

3. A valve cap having an internally threaded portion to screw on a tire valve casing and a reduced tubular extension on its opposite end, a packing washer of substantially the same diameter as the screw threaded portion of the cap within the cap above said threaded portion and means wholly enclosed within the cap for securing said washer in place comprising a part extending into the reduced tubular extension and swivelled thereto.

In witness whereof, I have hereunto signed my name.

MAXIMILIAN CHARLES SCHWEINERT.